(12) United States Patent
Iwasaki

(10) Patent No.: US 10,477,101 B2
(45) Date of Patent: Nov. 12, 2019

(54) FOCUS DETECTION APPARATUS, CONTROL METHOD AND STORAGE MEDIUM

(71) Applicant: CANON KABUSHIKI KAISHA, Tokyo (JP)

(72) Inventor: Naoki Iwasaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/626,650

(22) Filed: Jun. 19, 2017

(65) Prior Publication Data

US 2017/0366739 A1 Dec. 21, 2017

(30) Foreign Application Priority Data

Jun. 21, 2016 (JP) ................................. 2016-122875

(51) Int. Cl.
*H04N 5/232* (2006.01)

(52) U.S. Cl.
CPC ... *H04N 5/232127* (2018.08); *H04N 5/23212* (2013.01); *H04N 5/23219* (2013.01); *H04N 5/23245* (2013.01); *H04N 5/232122* (2018.08); *H04N 5/232123* (2018.08); *H04N 5/232945* (2018.08)

(58) Field of Classification Search
CPC ......... H04N 5/23212; H04N 5/232122; H04N 5/232123; H04N 5/232127; H04N 5/23219; H04N 5/23245; H04N 5/232945
See application file for complete search history.

(56) References Cited

U.S. PATENT DOCUMENTS

| 2007/0160359 A1* | 7/2007 | Imamura | G02B 7/102 396/238 |
| 2008/0193116 A1* | 8/2008 | Uenishi | H04N 5/23212 396/135 |
| 2010/0097515 A1* | 4/2010 | Ishii | H04N 5/23212 348/349 |
| 2013/0265482 A1* | 10/2013 | Funamoto | H04N 5/23212 348/349 |
| 2013/0307993 A1* | 11/2013 | Kawarada | H04N 5/23212 348/169 |
| 2015/0022682 A1* | 1/2015 | Seita | H04N 5/23245 348/220.1 |
| 2016/0295120 A1* | 10/2016 | Ota | H04N 5/23293 |

FOREIGN PATENT DOCUMENTS

JP 2003-107335 A 4/2003
JP 2009-037152 A 2/2009

* cited by examiner

*Primary Examiner* — Daniel M Pasiewicz

(57) ABSTRACT

A focus detection apparatus comprises: a reception unit configured to receive designation of a region within an image; a first setting unit configured to set one focus detection mode out of at least a first mode for performing focus detection with priority to a region of a subject and a second mode for performing focus detection with priority to the designated region; a second setting unit configured to set a focus detection region; a selection unit configured to select a region to focus on based on a focus detection result of the focus detection region; and a control unit, wherein the second setting unit, in the first mode, sets the focus detection region based on a result of a detection of a subject, and is the second mode, sets the focus detection region based on the designated region.

12 Claims, 12 Drawing Sheets

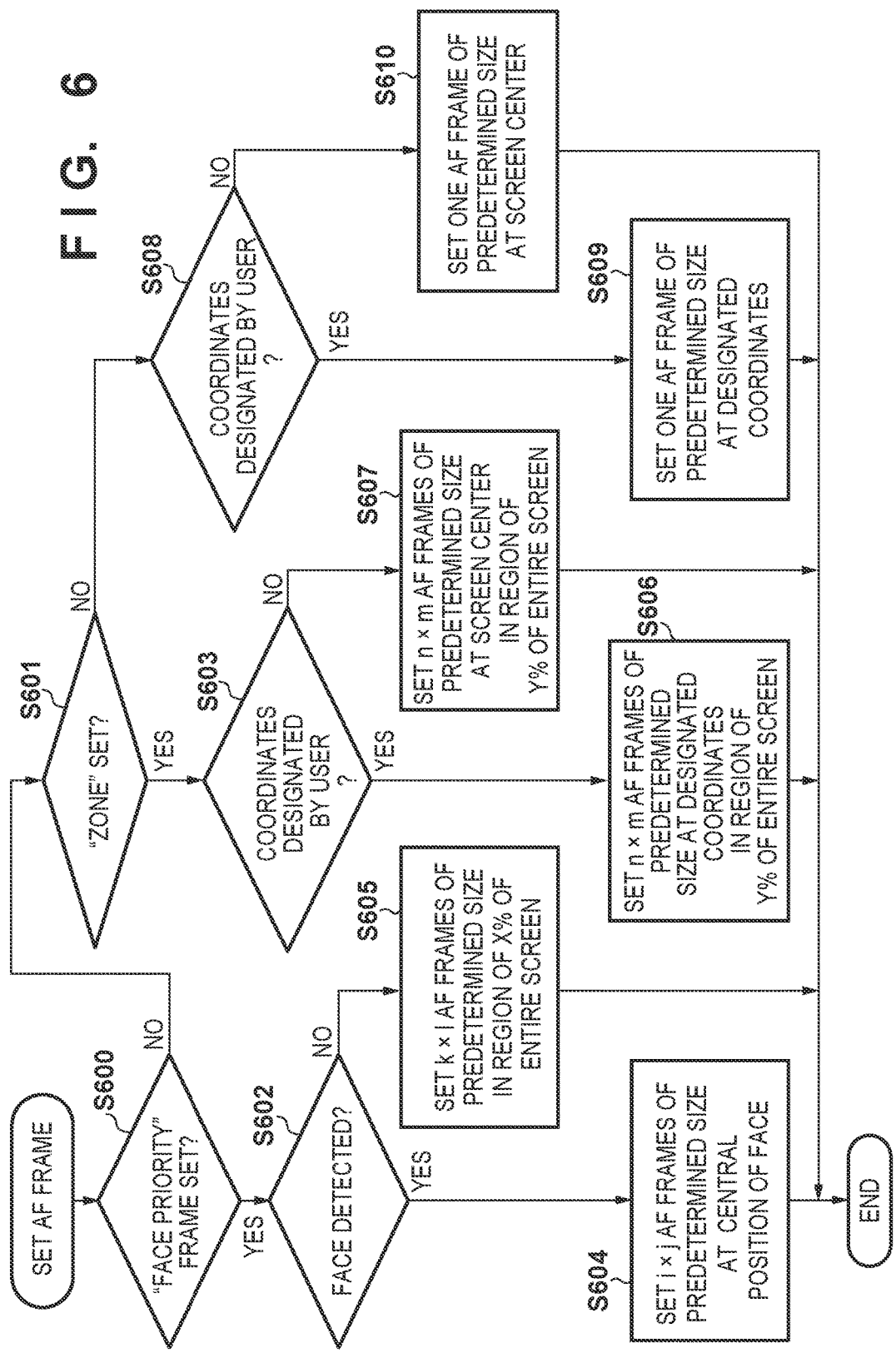

FOCUS DETECTION APPARATUS, CONTROL METHOD AND STORAGE MEDIUM

BACKGROUND OF THE INVENTION

Field of the Invention

The present invention relates to a focus detection apparatus, a control method and a storage medium.

Description of the Related Art

In recent years, regarding image capturing apparatuses such as single-lens reflex cameras, the importance of a shooting method for performing shooting while viewing a LV (live view) screen has been increasing. Also, regarding AR (autofocus) control that operates when performing shooting while viewing the LV screen, quality in the focusing operation is demanded in addition to responsiveness for quick focusing.

As techniques for realizing AR control of an image capturing apparatus, a phase difference detection method and a contrast detection method are known. In addition, recently, as an AR method that makes it possible to perform focusing at high speed and with high quality even at the time of LV shooting, an on-imaging plane phase difference detection method for performing the phase difference detection method on an image sensor plane is known. In this on-imaging plane phase difference detection method, pupil division is performed on the imaging pixels of the image sensor using a microlens, and a light beam is received by a plurality of focus detection pixels, and thereby focus detection can be performed while performing image capturing.

Incidentally, when performing such focus detection, a focus detecting operation needs to be performed after determining which region to focus on. As a technique for determining the region to focus on, a technique for performing a focus detecting operation on a region detected by a face detection technique has been proposed (Japanese Patent Laid-Open No. 2003-107335). Moreover, a technique for performing a focus detecting operation on any region of a shot image designated by the user has been proposed (Japanese Patent Laid-Open No. 2009-37152).

However, with the technique proposed in Japanese Patent Laid-Open No. 2003-107335, there are cases where, even with a face detection technique, a face other than the face of the subject that the photographer wants to shoot (in other words, a face outside of the desired region) is detected, and focus detection cannot be performed as desired. On the other hand, there are also cases where the user is prompted to designate a focus detection region as proposed in Japanese Patent Laid Open No. 2009-37152, in order to prevent a region outside of the desired region being focused on. However, if it is desired to preferentially perform focus detection on a person, or if the subject that it is desired to focus on moves in and out of the designated region, there are cases where focus detection cannot be performed as desired.

SUMMARY OF THE INVENTION

The present invention has been made in consideration of the aforementioned problems, and realizes a technique that enables a focus detecting operation in which erroneous focus detection on a peripheral subject other than a main subject or with respect to a moving subject is reduced.

In order to solve the aforementioned problems, one aspect of the present invention provides a focus detection apparatus which performs focus detection using image information obtained by performing image capturing, comprising: a reception unit configured to receive designation of a region within an image; a first setting unit configured to set one focus detection mode out of a plurality of focus detection modes, wherein the focus detection modes include at least a first mode for performing focus detection with priority to a region of a subject within the image and a second mode for performing focus detection with priority to the designated region within the image received by the reception unit; a second setting unit configured to set a focus detection region for performing the focus detection; a selection unit configured to select a region to focus on out of the focus detection region based on a focus detection result of the focus detection region; and a control unit configured to perform focus adjustment so as to obtain image information in which the region to focus on is in focus, wherein the second setting unit, in the first mode, in a case where a subject is detected, sets the focus detection region based on the region of the subject, and in a case where a subject is not detected, sets the focus detection region to a predetermined region, and in the second mode, sets the focus detection region based on the designated region.

Another aspect of the present invention provides a focus detection apparatus comprising: a detection unit configured to detect a subject area from an image signal output from an image sensor that captures a subject image using an imaging optical system and outputs the image signal; a reception unit configured to receive designation of a region of the image signal output from the image sensor; a setting unit configured to set a focus detection area based on the designation of the region; a focus detection unit configured to detect a focus state of the focus detection area set by the setting unit; and a selection unit configured to select a focus area in which focus adjustment of the imaging optical system is to be performed, wherein the selection unit, in a case where a subject area is detected by the detection unit, selects a focus detection area that the subject area overlaps by a predetermined size or more as the focus area, and in a case where a subject area is not detected by the detection unit, preferentially selects a focus detection area whose focus state detected by the focus detection unit indicates a close range side, out of the focus detection area set by the setting unit, as the focus area.

Still another aspect of the present invention provides a control method of a focus detection apparatus which performs focus detection using image information obtained by performing image capturing, the method comprising: receiving designation of a region within an image; setting, as first setting, one focus detection mode out of a plurality of focus detection modes, wherein the focus detection modes include at least a first mode for performing focus detection with priority to a region of a subject within the image and a second mode for performing focus detection with priority to the designated region within the image; setting, as second setting, a focus detection region for performing the focus detection; selecting a region to focus on out of the focus detection region based on a focus detection result of the focus detection region; and controlling focus adjustment so as to obtain image information in which the region to focus on is in focus; wherein in the second setting, in the first mode, in a case where a subject is detected, the focus detection region is set based on the region of the subject, and in a case where a subject is not detected, the focus detection region is set to a predetermined region, and in the second mode, the focus detection region is set based on the designated region.

Yet another aspect of the present invention provides a control method of a focus detection apparatus, the method comprising: detecting a subject area from an image signal output from an image sensor that captures a subject image using an imaging optical system and outputs the image signal; receiving designation of a region of the image signal output from the image sensor; setting a focus detection area based on the designation of the region; performing focus detection to obtain a focus detection result of the focus detection area set in the setting; and selecting a focus area in which focus adjustment of the imaging optical system is to be performed, wherein in the selecting, in a case where a subject area is detected in the detecting, a focus detection area that the subject area overlaps by a predetermined size or more is selected as the focus area, and in a case where a subject area is not detected in the detecting, a focus detection area whose focus detection result detected in the focus detection indicates a close range side is preferentially selected, out of the focus detection area set in the setting, as the focus area.

Still yet another aspect of the present invention provides a non-transitory computer-readable storage medium storing a program for causing a computer to execute a control method of a focus detection apparatus which performs focus detection using image information obtained by performing image capturing, the method comprising: receiving designation of a region within an image; setting one focus detection mode out of a plurality of focus detection modes, wherein the focus detection modes include at least a first mode for performing focus detection with priority to a region of a subject within an image and a second mode for performing focus detection with priority to the designated region within the image; setting a focus detection region for performing the focus detection; selecting a region to focus on out of the focus detection region based on a focus detection result of the focus detection region; and performing focus adjustment so as to obtain image information in which the region to focus on is in focus, wherein in the first mode, in a case where a subject is detected, the focus detection region is set based on the region of the subject, and in a case where a subject is not detected, the focus detection region is set to a predetermined region, and in the second mode, the focus detection region is set based on the designated region.

Yet still another aspect of the present invention provides a non-transitory computer-readable storage medium storing a program for causing a computer to execute a control method of a focus detection apparatus which performs focus detection using image information obtained by performing image capturing, the method comprising: detecting a subject area from an image signal output from an image sensor that captures a subject image using an imaging optical system and outputs the image signal; receiving designation of a region of the image signal output from the image sensor; setting a focus detection area based on the designation of the region; detecting a focus detection result of the set focus detection area; and selecting a focus area in which focus adjustment of the imaging optical system is to be performed, wherein in the selecting of the focus area, in a case where a subject area is detected, a focus detection area that the subject area overlaps by a predetermined size or more is selected as the focus area, and in a case where a subject area is not detected, a focus detection area whose focus detection result indicates a close range side is preferentially selected, out of the focus detection area set in the setting, as the focus area.

According to the present invention, a focus detecting operation that reduces erroneous focus detection on a peripheral subject other than a main subject or with respect to a moving subject is possible.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 6 is a flowchart showing a series of operations of AF frame setting processing.

FIG. 12 is a diagram showing an example of an index assigned to each AF frame.

FIGS. 13A and 13B are diagrams schematically showing focus frame display when "face priority" and "zone" are set.

DESCRIPTION OF THE EMBODIMENTS

An exemplary embodiment of the present invention will be described below in detail with reference to the drawings. Note that a case will be described below in which an interchangeable-lens digital single-lens reflex camera that has an AF function is used as an example of a focus detection apparatus. However, this embodiment is not limited to an interchangeable-lens camera, and can be applied to any devices that have an AF function. Such devices may include personal computers, mobile phones including smart phones, gaming devices, tablet terminals, watch or eye glass-type information terminals, medical devices, and devices for a monitoring system and an on-vehicle system, for example.

Configuration of Digital Camera

Figure 1:
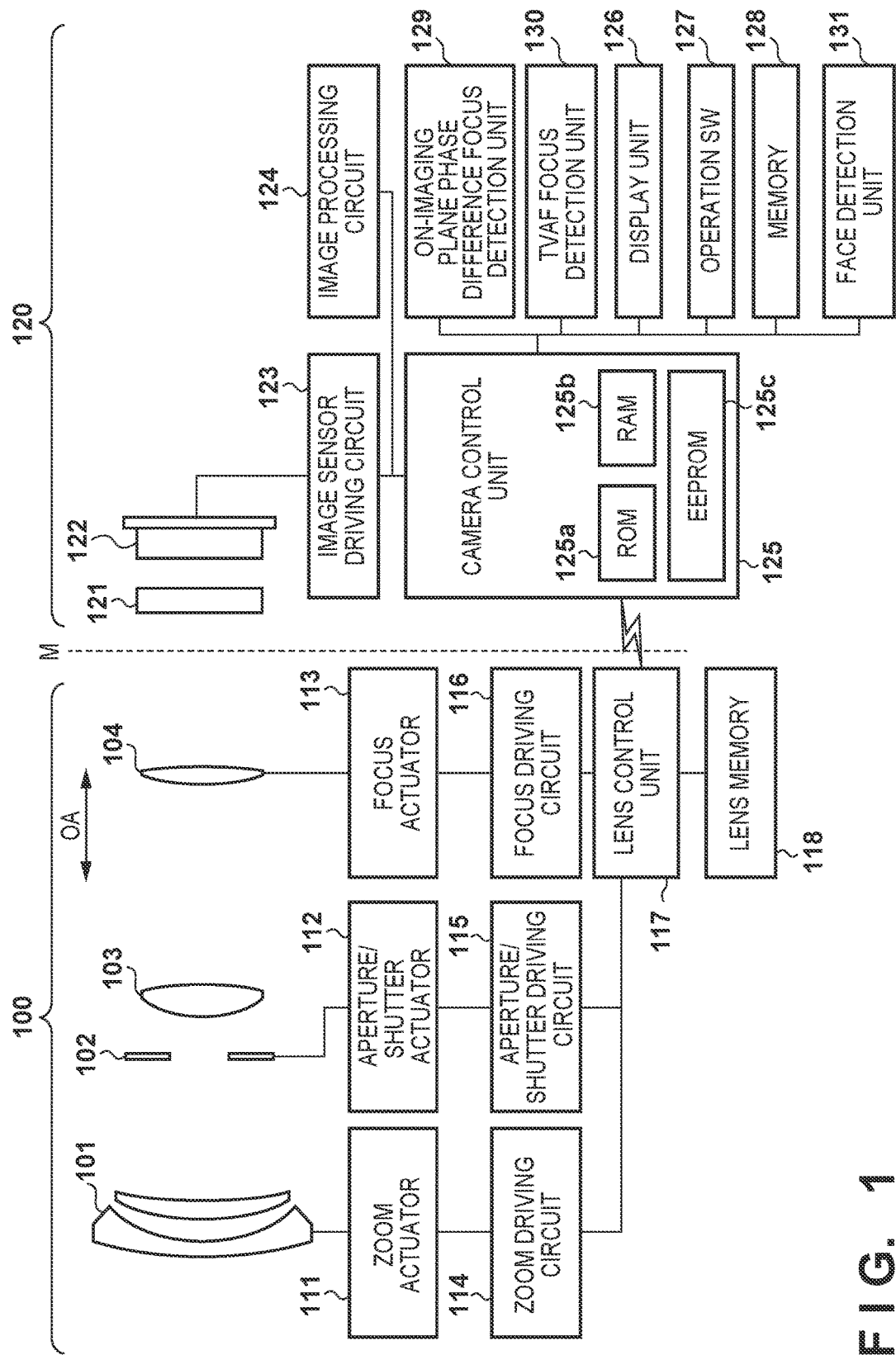
FIG. 1 is a block diagram showing an example of the function configuration of a lens-interchangeable camera as an example of a focus detection apparatus according to an embodiment of the present invention.

FIG. 1 is a block diagram showing an example of the function configuration of a digital camera according to this embodiment. Note that one or more functional blocks shown in FIG. 1 may be realized by hardware such as an ASIC or a programmable logic array (PLA), or may be realized by a programmable processor such as a CPU or an MPU executing software. Also, the functional blocks may be realized by a combination of software and hardware. Therefore, in the following description, even if different functional blocks are described as performing an operation, these functional blocks can be realized by the same hardware performing the operation.

As shown in FIG. 1, the digital camera of this embodiment has a lens unit 100 and a camera body 120. The lens unit 100 is mechanically connected to the camera body 120 via a mount N indicated by a dotted line in the center the figure.

The lens unit 100 has a first lens group 101, a aperture/shutter 102, a second lens group 103, a focus lens group (hereinafter, simply referred to as a "focus lens") 104, and a control unit, which will be described later. As described above, the lens unit 100 includes the focus lens 104, and has an imaging optical system for forming a subject image on the imaging plane of an image sensor 122 of the camera body 120.

The first lens group 101 is arranged at the front end of the lens unit 100, and is held so as to be able to advance and retreat in an optical axis direction OA. The aperture; shutter 102 performs light amount adjustment at the time of shooting by adjusting the opening diameter thereof, and functions as a shutter for exposure time adjustment at the time of shooting a still image. The aperture/shutter 102 and the second lens group 103 advance and retreat in the optical axis direction OA in an integrated manner, and realize a zoom function in conjunction with the advancing/retreating operation of the first lens group 101. The focus lens 104 performs focus adjustment by advancing and retreating in the optical axis direction.

The control unit of the lens unit 100 has a zoom actuator 111, a aperture/shutter actuator 112, a focus actuator 113, a zoom driving circuit 114, a aperture/shutter driving circuit 115, a focus driving circuit 116, lens control unit 117 and a lens memory 118.

The zoom actuator 111 drives the first lens group 101 and the second lens group 103 to advance and retreat is the optical axis direction OA so as to perform a zoom operation. The aperture/shutter actuator 112 controls the opening diameter of the aperture/shutter 102 so as to adjust a shooting light amount, and controls an exposure duration at the time of shooting a still image. The focus actuator 113 drives the focus lens 104 to advance and retreat in the optical axis direction OA so as to perform focus adjustment. The focus actuator 113 has a function as a position detection unit for detecting the current position of the focus lens 104. The zoom driving circuit 114 drives the zoom actuator 111 according to a zoom operation performed by the photographer. The aperture/shutter driving circuit 115 performs drive control of the aperture/shutter actuator 112 so as to control the opening of the aperture/shutter 102. The focus driving circuit 116 performs drive control of the focus actuator 113 based on a focus detection result so as to drive the focus lens 104 to advance and retreat in the optical axis direction OA so as to perform focus adjustment.

The lens control unit 117 performs calculation and control related to the imaging optical system for forming a subject image on the image sensor 122, and controls the zoom driving circuit 114, the aperture/shutter driving circuit 115, the focus driving circuit 116 and the lens memory 118. Also, the lens control unit 117 detects the current lens position, and notifies lens position information in response to a request from a camera control unit 125. The lens memory 118 stores optical information required for automatic focus adjustment, and outputs the optical information to the lens control unit 117.

The camera body 120 has an optical low-pass filter 121, the image sensor 122, and a control unit, which will be described later. The optical low-pass filter 121 reduces false color and moire of an image. The image sensor 122 is constituted by a C-MOS sensor and peripheral circuits thereof, for example, and one photoelectric conversion element is arranged on light receiving pixels composed of m pixels in the horizontal direction and n pixels in the vertical direction. The image sensor 122 is configured such that independent output from each of all the pixels is possible. Moreover, a portion or all of the pixels are focus detection pixels, and due to a configuration in which one microlens is arranged for a pair of focus detection pixels, phase difference AF focus detection (on-imaging plane phase difference AF) is possible on the imaging plane.

The control unit of the camera body 120 has an image sensor driving circuit 123, an image processing circuit 124, the camera control unit 125, a display unit 126, an operation switch (SW) 127, a memory 128, an on-imaging plane phase difference focus detection unit 129, a TVAF focus detection unit 130 and a face detection unit 131.

The image sensor driving circuit 123 controls operations of the image sensor 122, and performs A/D conversion on analog image signals that have been output from the image sensor 122, and transmits the converted signals as image information to the camera control unit 125. The image processing circuit 124 performs γ conversion, color interpolation and JPEG compression on image information obtained from the image sensor 122.

The camera control unit (processor) 125 performs calculation and control in order to perform overall control of the camera body 120, and controls constituent elements such as the image sensor driving circuit 123 and the image processing circuit 124. Also, the camera control unit 125 is connected to the lens control unit 117 via a signal line of the mount M, and transmits, to the lens control unit 117, control signals for controlling obtaining of the lens position and lens driving by a predetermined drive amount, and receives optical information specific to the lens unit 100. Furthermore, the camera control unit 125 includes a ROM 125a that stores a program for controlling a camera operation, a RAM 125b that temporarily stores variables for operating a program, and an EEPROM 125c that stores various parameters.

Furthermore, the camera control unit 125 executes focus detection processing using the program stored in the RCM 125a. The focus detection processing will be described in detail later. In on-imaging plane phase difference AF on which focus detection processing is based, the influence of vignetting is large and reliability deteriorates when the image height at the focus detection position is high, and thus the camera control unit 125 performs correction for such situations.

The display unit 126 is constituted by an LCD, an OLED or the like, and displays information regarding the shooting mode of the camera, a preview image before shooting and an image for checking after shooting, a focus state display image at the time of focus detection, a user interface for settings or operations, and the like. The operation SW 127 is constituted by a power switch, a release (shooting trigger)

switch, a on operation switch, a shooting mode selection switch and the like. The memory 128 of this embodiment is a removable flash memory, for example, and records shot images.

The on-imaging plane phase difference focus detection unit 129 performs focus detection processing employing an on-imaging plane phase difference AF method, using image signals of the focus detection pixels embedded in the image sensor 122. More specifically, the on-imaging plane phase difference focus detection unit 129 performs on-imaging plane phase difference AF based on the shift amount of a pair of images formed by focus detection pixels from a light beam that has passed through a pair of pupil regions of the imaging optical system.

The TVAF focus detection unit 130 performs contrast focus detection processing using the contrast components of image information obtained in the image processing circuit 124. In the contrast focus detection processing, the position of the focus lens at which a contrast evaluation value (TVAF evaluation value) peaks is detected regarding image information that has been shot while performing shooting after moving the focus lens 104.

The face detection unit 131 extracts a feature amount from the image information obtained by the image processing circuit 124, detects a face of a person, and specifies the region of the face of the person in the image. Note that a known face recognition technique can be used for detecting a face of a person using image information.

Note that in this embodiment, description is given assuming that processing of both an on-imaging plane phase difference AF method and a contrast AF method can be executed, but a configuration may be adopted in which only either an on-imaging plane phase difference AF or a contrast AF method is provided.

Series of Operations Regarding Focus Detection Processing

Figure 2:
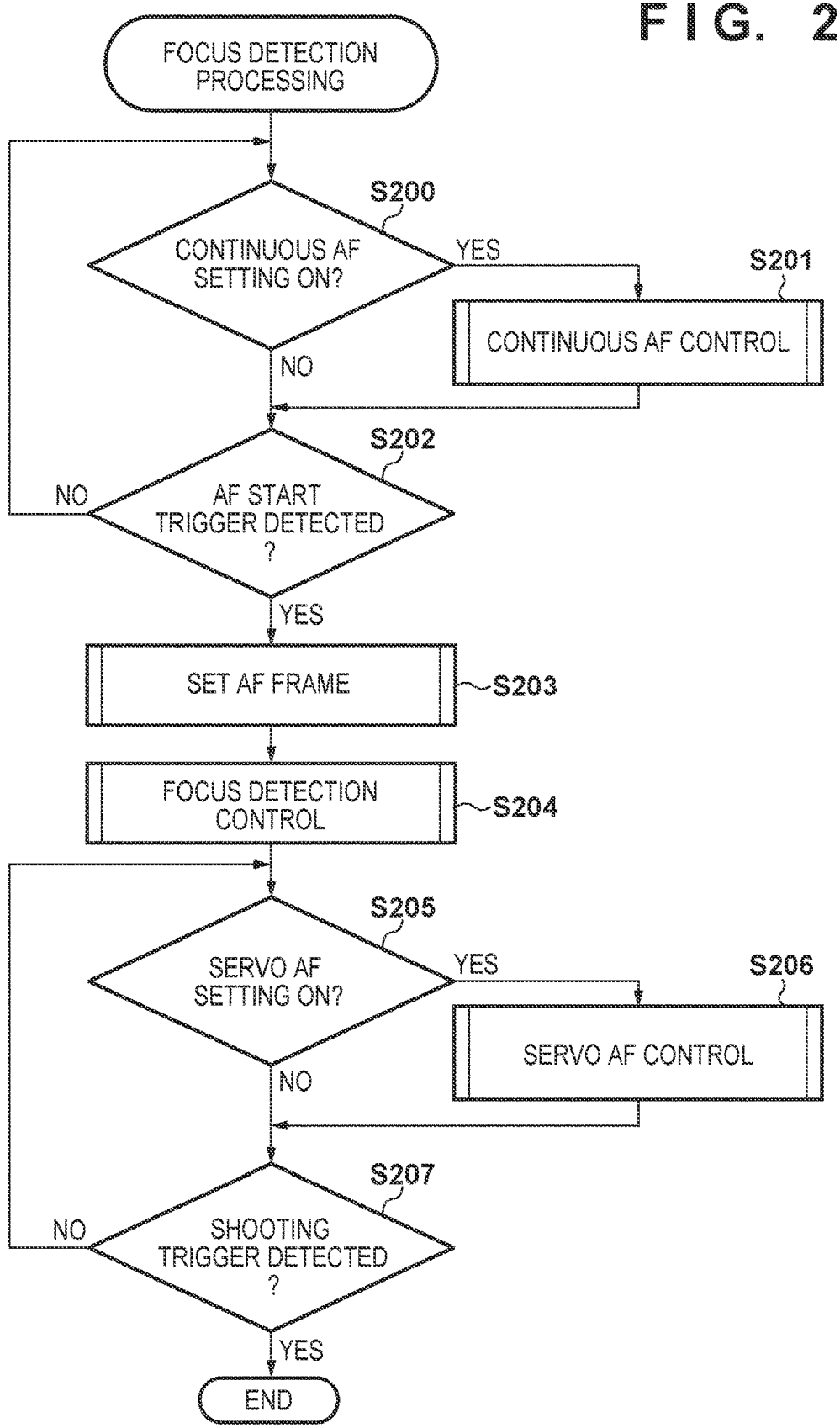
FIG. 2 is a flowchart showing an entire series of operations regarding focus detection processing.

Next, a series of operations regarding focus detection processing will be described with reference to FIG. 2. Note that this processing is started when the power switch included in the operation SW 127 is turned on, for example. In addition, this processing is realized by the camera control unit 125 loading a program stored in the RPM 125a to a work area of the RAM 125b and executing the program, and controlling constituent elements such as the on-imaging plane phase difference focus detection unit 129.

In step S200, the camera control unit 125 determines whether or not the setting of continuous AF control is enabled. If it is determined that the setting of continuous AF control is enabled, the procedure advances to step S201, and in step S201, continuous AF control for keeping the subject in focus after the camera is started is executed. Description thereof will be given in detail with reference to FIG. 3.

In step S202, the camera control unit 125 determines whether or not an operation of the release (an AF start trigger) switch in the operation SW 127 has been detected, and if an AF start trigger has been detected, advances the procedure to step S203. On the other hand, if an AF start trigger has not been detected, the procedure returns to step S200.

In step S203, the camera control unit 125 performs AF frame setting, which will be described later with reference to FIG. 6. An AF frame defines a region in which focus detection processing is performed in a region that has been set as the AF frame (a focus detection region). In this embodiment, as the AF frame setting, three different AF frames, namely, "face priority", "zone", and "single point" can be set. These settings can be made as appropriate by the user from the operation SW 127 or a user interface of the display unit 126. Detailed description will be given with reference to FIG. 6. In step S204, the camera control unit 125 executes focus detection control employing a contrast AF method or focus detection control employing an on-imaging plane phase difference AF method, which will be described later. Regarding these AF methods, a configuration may be adopted in which the contrast AF method or the on-imaging plane phase difference AR method switches dynamically based on the reliability of on-imaging plane phase difference AF, which will be described later. A configuration may also be adopted in which focus detection control is executed exclusively according to the form of the product. A technique for executing the focus detection control of each type will be described below assuming a configuration in which these AR methods are executed exclusively.

In step S205, the camera control unit 125 determines whether or not the setting of servo AR control is enabled, and if the setting is enabled, advances the procedure to step S206. On the other hand, if the setting of servo AF control is not enabled, servo AR control is not executed, and the procedure advances to step S207. In step S206, the camera control unit 125 executes servo AF control for keeping the subject in focus until a shooting instruction is given, and advances the procedure to step S207. The series of operations regarding servo AF control processing is similar to continuous AF control processing, and thus detailed description will be given with reference to FIG. 3. In step S207, the camera control unit 125 determines whether or not a shooting trigger has been detected, and if a shooting trigger has been detected, ends a series of operations regarding this processing. On the other hand, if a shooting trigger has not been detected, the procedure returns to step S205. Note that focus detection control of steps S202 to S204 can be applied to AF during continuous shooting and the like.

Series of Operations Regarding Continuous AF Control Processing

Figure 3:
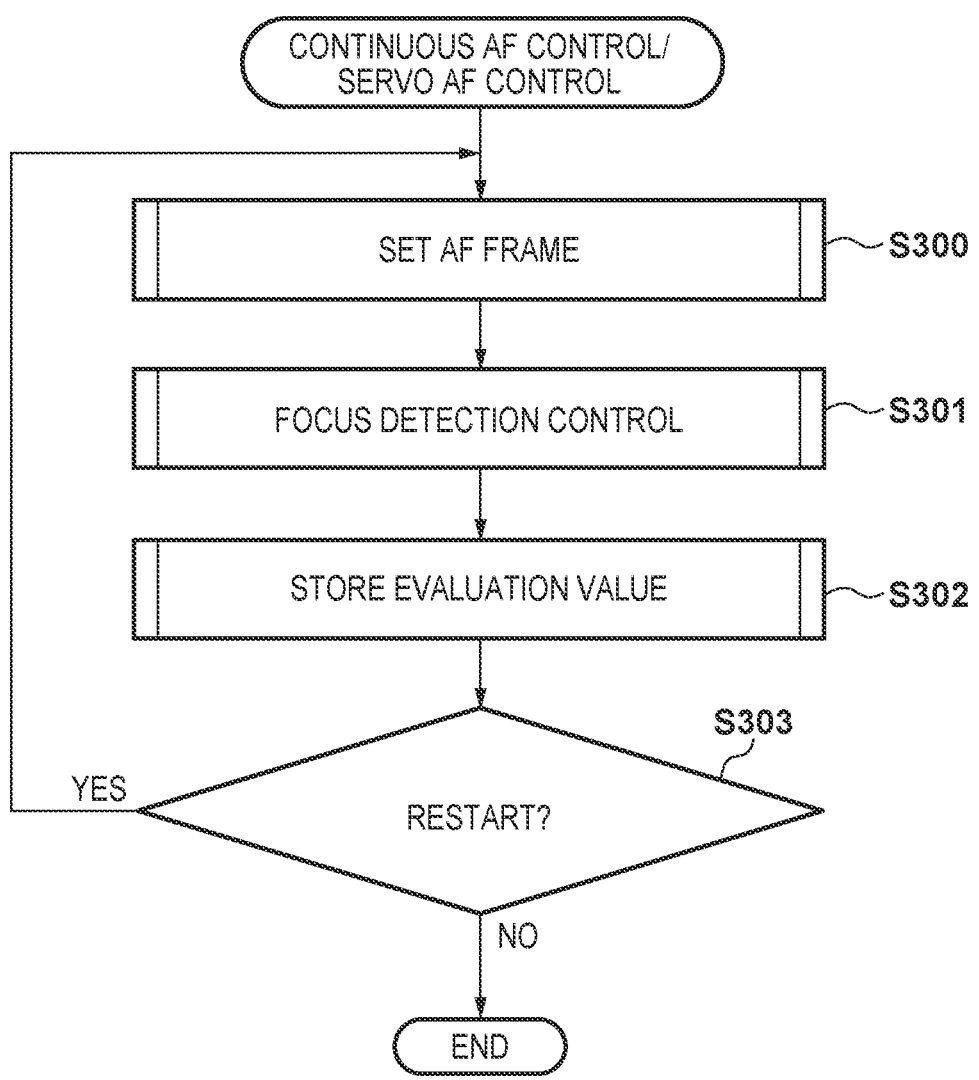
FIG. 3 is a flowchart showing a series of operations regarding continuous AF control and servo AF control.

Next, the continuous AF control processing regarding step S201 in FIG. 2 will be described with reference to FIG. 3. Note that as described above, the continuous AF control processing can also be applied to the servo AF control processing of step S206 in FIG. 2.

Figure 4:
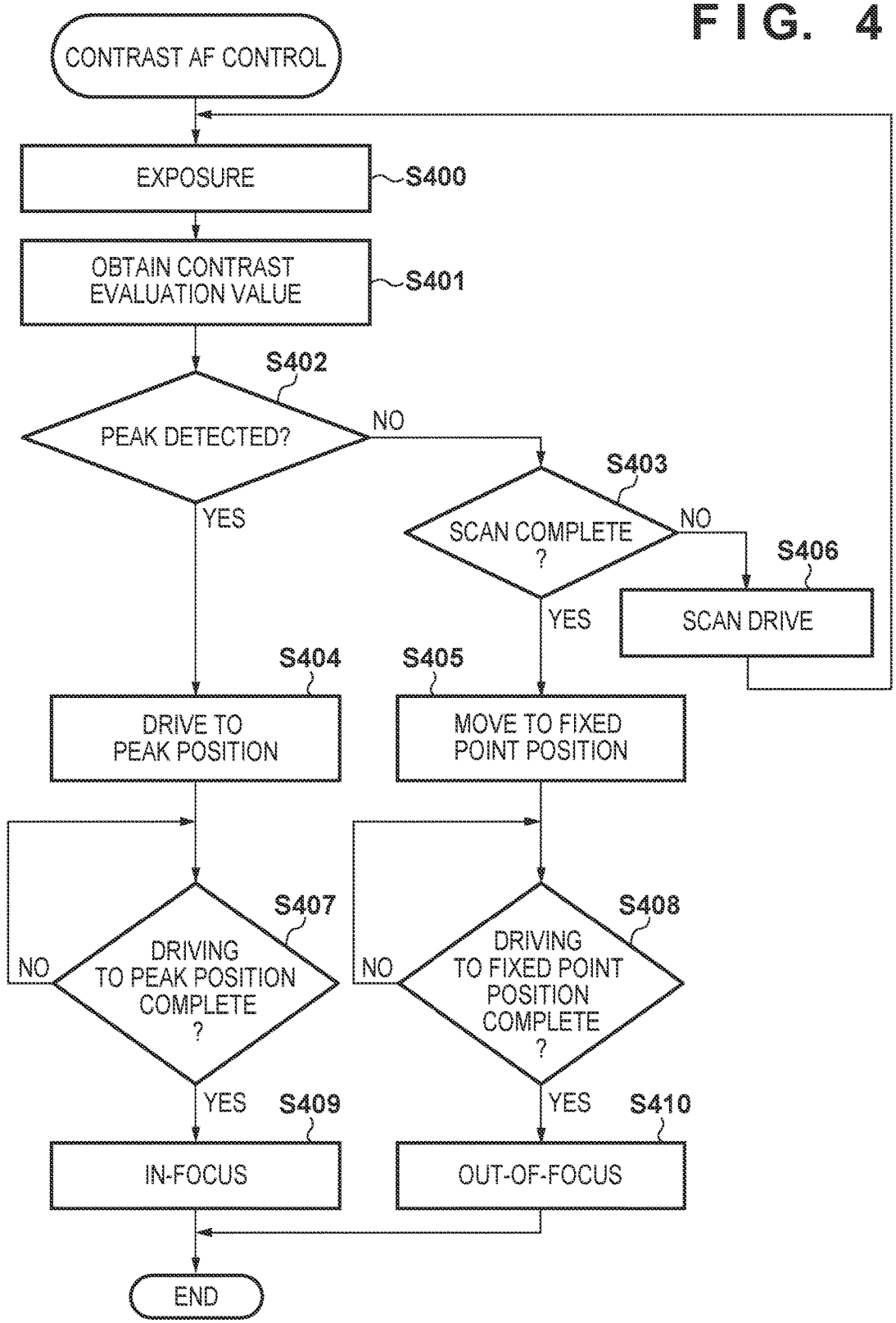
FIG. 4 is a flowchart showing a series of operations in the case where a contrast AF method is adopted in focus detection control processing.
Figure 5:
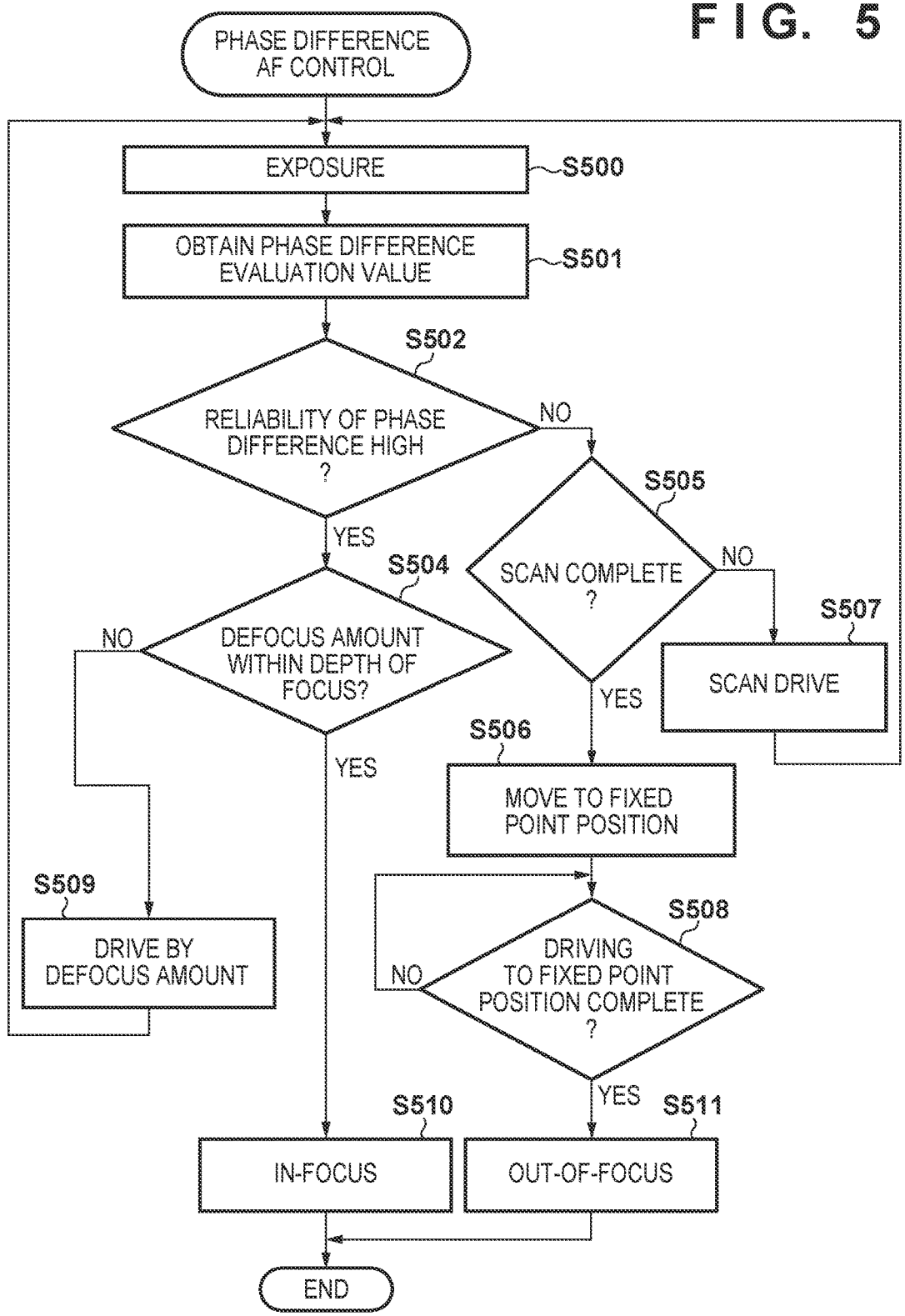
FIG. 5 is a flowchart showing a series of operations in the case where an on-imaging plane phase difference AF method is adopted in focus detection control processing.

In step S300, the camera control unit 125 performs the above described AF frame setting in step S205. Note that the AF frame setting will be described later with reference to FIG. 6 and the like. In step S301, focus detection control, which will be described later with reference to FIGS. 4 and 5, is performed. In step S302, the camera control unit 125 stores a phase difference evaluation value (hereinafter, also referred to as a defocus amount) or a contrast evaluation value in the RAM 125b according to the AF method adopted for focus detection control. In step S303, the camera control unit 125 determines whether or not to perform restart. Restart determination is performed such that, if a stored evaluation value and a newly detected evaluation value are different by an evaluation value threshold or more, at is determined that restart should be performed. Alternatively, if the movement amount of the subject is greater than a movement amount threshold according to the movement amount of the subject, it may be determined that restart should be performed. If it is determined that restart should be performed, the camera control unit 125 returns the procedure to step S300, and executes the focus detection AF operation again. On the other hand, if it is determined to not perform restart, this series of operations is ended. In this manner, the basic operations of continuous AF control and servo AF control are similar, but in this embodiment, the control cycle of servo AF is set at a higher speed than continuous AF control. This makes it possible to suppress power consumption before AF start is triggered, and to perform focus tracking at a higher speed after an AF instruction. In addition, a configuration may be adopted in which it is determined according to the movement state of the subject whether or not to execute continuous AF control and servo AF control, or selection may be performed according to a user operation.

Series of Operations Regarding Contrast AF Method

Furthermore, a series of operations in the case where a contrast AF method is adopted in focus detection control in step S204 will be described with reference to FIG. 4. The case of a single point AF frame setting will be described in order to simplify the description. Note that this series of processing is executed by the camera control unit 125 controlling the TVAF focus detection unit 130.

In step S400, the camera control unit 125, via the lens control unit 117, exposes the image sensor 122 at a plurality of focus lens positions in order to calculate contrast evaluation values. In step S401, the TVAF focus detection unit 130 obtains contrast evaluation values based on image information obtained by the exposure. In step S402, the TVAF focus detection unit 130 determines whether or not a peak has been detected in the contrast evaluation values. The peak of the contrast evaluation value is determined according to whether or not a local maximum value that is greater than or equal to a predetermined value has been detected among the contrast evaluation values obtained at the focus lens positions. If at is determined that a peak has been detected, the TVAF focus detection unit 130 advances the procedure to step S404. On the other hand, if it is not determined a peak has been detected, the procedure advances to step S403.

In step S404, the camera control unit 125 uses the lens control unit 117 to move the focus lens 104 to the peak position detected in step S402. In step S407, the camera control unit 125 stands by until the focus lens 104 is driven to the peak position (in other words, repeats the processing of step S407), and if it is determined that the focus lens 104 has been driven to the peak position, advances the procedure to step S409. After that, in step S409, the focus state transitions to an in-focus state. The camera control unit 125 then ends this series of processing.

On the other hand, in step S403, the TVAF focus detection unit 130 determines whether or not to end scanning. In the scanning end determination, whether or not the entire region from a near end to a far end has been scanned is determined. If it is determined that the entire region has been scanned, it is determined that scanning is complete, and the procedure advances to step S405. On the other hand, if it is determined the entire region has not been scanned, it is determined that scanning is not complete, and the procedure advances to step S406. In step S406, the TVAF focus detection unit 130 moves focusing by a predetermined amount, continues the scanning, and returns the procedure to step S400.

In step S405, the camera control unit 125 moves the focus lens 104 to an appropriate fixed point position since a peak could not be detected. The fixed point position may be the scanning start position or a hyperfocal position. After that, in step S408, the camera control unit 125 determines, based on the information from the lens control unit 117, whether or not movement of the focus lens 104 to the fixed point position is complete. If it is determined that movement to the fixed point position is complete, the procedure advances to step S410, and it is determined that movement to the fixed point position is not complete, the procedure returns to step S408. Note that the lens does not need to be driven from the scanning end position in order to shorten the focus detection time.

After that, in step S410, the camera control unit 125 performs transition to an out-of-focus state, and ends this series of processing. Note that in steps S409 and S410, a configuration may be adopted in which the user uses the operation SW 127 or the like to determine whether the state is an an-focus state or an out-of-focus state, and the camera control unit 125 performs transition to each state. In this case, the camera control unit 125 outputs, to the display unit 126 and the like, display indicating the focus state of the current image information. For example, it is sufficient that if the focus state is an in-focus state, an AF frame that has been set is displayed in green, and if the focus state is an out-of-focus state, the AF frame is displayed in red, or the like. Moreover, in step S205, if it is determined that servo AF control is enabled, the focus display is updated every time focus detection control of step S301 shown in FIG. 3 is repeated.

Series of Operations Regarding On-Imaging Plane Phase Difference AF Method

Next, a series of operations in the case where an on-imaging plane phase difference AF method is adopted in focus detection control in step S204 will be described with reference to FIG. 5. In order to simplify the description, the case of setting single point AF frame will be described. Note that this series of processing is executed by the camera control unit 125 controlling the on-imaging pjane phase difference focus detection unit 129.

In step S500, the camera control unit 125 exposes the image sensor 122 in order to obtain image information for calculating a defocus amount. In step S501, the on-imaging plane phase difference focus detection unit 129 obtains a defocus amount based on the image information according to an instruction of the camera control unit 125. In step S502, the on-imaging plane phase difference focus detection unit 129 determines whether or not the reliability of the phase difference is high, and determines whether or not the defocus amount can be used. For example, this reliability of the phase difference can be obtained according to an image height or an F-number, and whether or not the obtained reliability can be used can be determined according to whether or not the reliability is greater than or equal to a predetermined reliability threshold, but another method may be used. If the reliability of the phase difference is greater than or equal to the predetermined reliability threshold, the on-imaging plane phase difference focus detection unit 129 advances the procedure to step S504, and if the reliability of the phase difference is smaller than the predetermined reliability threshold, determines that the reliability of the phase difference is low, and advances the procedure to step S505.

In step S504, the on-imaging plane phase difference focus detection unit 129 determines whether or not the defocus amount for achieving an in-focus position is within the depth of focus, and if it is determined that the defocus amount is within the depth of focus, performs transition to an in-focus state in step S510, and ends the processing. On the other hand, if it is determined that the defocus amount is outside of the depth of focus, the on-imaging plane phase difference focus detection unit 129 advances the procedure to step S509. In step S509, the camera control unit 125 moves the focus lens 104 by a defocus drive amount corresponding to the defocus amount obtained in step S501, and then advances the procedure to step S500.

In step S505, the on-imaging plane phase difference focus detection unit 129 determines whether or not the entire region from the far end to the near end has been scanned in order to move the position of the focus lens 104 so as to obtain a defocus amount of higher reliability. If it is determined that the entire region has not been scanned, the on-imaging plane phase difference focus detection unit 129 advances the procedure to step S507, and on the other hand, if the entire region has been scanned, advances the procedure to step S506. In step S507, for example, the camera control unit 125 moves the focus lens 104 by a predetermined amount, returns the procedure to step S500, and continues scanning.

In step S506, the camera control unit 125 moves the position of the focus lens 104 to an appropriate fixed point position since an in-focus position could not be detected. This fixed point position may be the scanning start position or a hyperfocal position. After that, in step S508, the camera control unit 125 determines, based on information from the lens control unit 117, whether or not movement of the focus lens 104 to the fixed point position is complete. If it is determined that movement to the fixed point position is complete, the procedure advances to step S511, and if it is determined that movement to the fixed point position is not complete, the procedure returns to step S508. Note that the lens does not need to be driven from the scanning end position in order to reduce the focus detection time.

After that, the step S511, the camera control unit 125 performs state transition to an out-of-focus state, and ends the processing. Note that in steps S510 and S511, as described above, a configuration may be adopted in which the user uses the operation SW 127 or the like to determine whether the focus state is an in-focus state or an out-of-focus state, and the camera control unit 125 performs transition to each state, and display of the display unit 126 may be controlled similarly to the case of steps S409 and S410.

Series of Operations Regarding AF Frame Setting Processing

Furthermore, a series of operations regarding the AF frame setting processing of step S203 in FIG. 2 and step S300 in FIG. 3 will be described with reference to FIG. 6. In this processing, a region for performing focus detection is determined according to information regarding AF frame setting that has been made by the user, and the region is set as an AF frame.

In step S600, the camera control unit 125 reads out information regarding the AF frame setting that has been made by the user, from the EEPROM 125c, for example, and determines whether or not setting of "face priority" has been made. If "face priority" is set, the procedure advances to step S602, and if "face priority" is not set, the procedure advances to step S601.

In step S601, the camera control unit 125 determines whether or not "zone" (namely, a region within the image) is set as AF frame setting. For example, data is read out from the EEPROM 125c, and it is determined that a zone within the image for performing face detection processing is set, the procedure advances to step S603. On the other hand, if it is determined that such a zone is not set, it is determined that a single point AF frame is set, and the procedure advances to step S608.

In step S602, the face detection unit 131 determines whether or not a face has been detected, according to an instruction of the camera control unit 125. As described above, a known face detection technique can be used for detecting a face, and, for example, if the position and size of a valid face region was obtained as a result of the face detection processing, it is determined that a face has been detected, and the procedure advances to step S604. On the other hand, if an effective position and size of a face region was not obtained, it is determined that a face has not been detected, and the procedure advances to step S605.

Figure 7A:
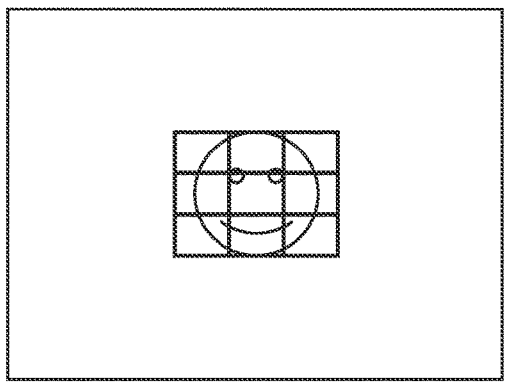
FIGS. 7A to 7E are diagrams schematically showing an example of AF frame setting.
Figure 7B:
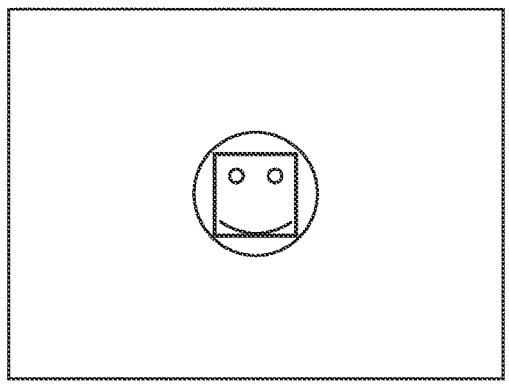

In step S604, the camera control unit 125 sets, at the central position of the detected face, an AF frame that is constituted by i horizontal regions and j vertical regions of a predetermined size and includes the face region. An AF frame constituted by a plurality of regions centered on the face is set in order to avoid a case where, if the subject is moving in the screen direction (if the size of the subject changes), the subject moves out of the detection range depending on the speed if the AF frame is composed of only one region, and erroneous distance measurement is performed. In addition, information obtained from a peripheral AF frame can also be used. However, if it is desired to reduce the processing time, an AF frame composed of a 1×1 region may also be set. For example, FIGS. 7A and 7B show an AF frame that is set in this embodiment. The example in FIG. 7A is an example in which the above AF frame is set using a plurality of regions (3×3), and the example in FIG. 7B is an example in which an AF frame composed of 1×1 region is set.

Figure 7C:
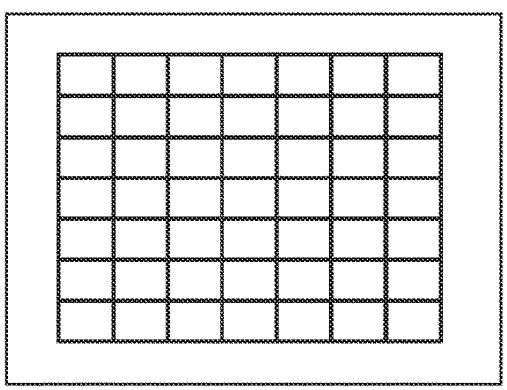

On the other hand, if it is determined in step S602 that a face has not been detected, the camera control unit 125 sets k horizontal AF frames and l vertical AF frames in a region of X % of the entire screen in step S605. This X is set for preventing focus detection from being performed on a subject in the periphery other than the main subject, by restricting the region to a region in which it is highly possible that the user will perform focusing (in other words, restricting the range of focus detection within the range of X % of the entire screen). FIG. 7C schematically shows AF frames that have been set in the above step S605.

In step S603, the camera control unit 125 determines whether or not the center coordinates of the zone have been set by the user. This setting is made using a configuration that makes it possible to change the center coordinates, for example, via a touch panel (not illustrated), or via an arrow key included in the operation SW 127. If it is determined that the center coordinates of the above-described zone have been set via the above-described touch panel or the operation SW 127, the camera control unit 125 advances the procedure to step S606. On the other hand, if it is determined that the center coordinates of the above zone have not been designated, the camera control unit 125 advances the procedure to step S607.

Figure 7D:
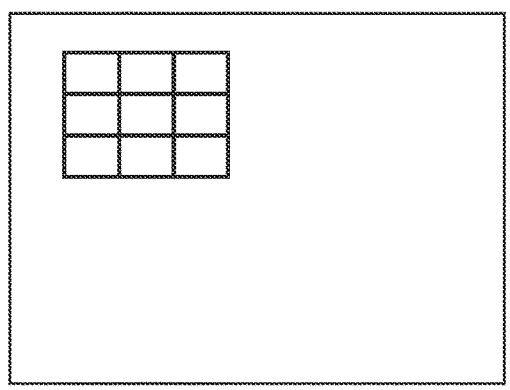

In step S606, the camera control unit 125 sets, at the designated center coordinates, n horizontal AF frames and m vertical AF frames in a region of Y % of the entire image. Note that this Y % is set to obtain a region smaller than the region of X % of the entire image that is set in step S605. This configuration is adopted in order to realize, in a scene in which focus detection is performed outside of the desired region after having performed focus detection in the region set in step S605, focus detection in the region intended by the user by narrowing the region to be subjected to focus detection. On the other hand, if the region to be subjected to focus detection is greater than in the case of a single point AF frame setting to be described later, the coordinates of the region of Y % of the entire image can be designated easily, and as described above, information regarding a plurality AF frames is obtained for a subject that moves in the screen direction, and thus focus detection tracking ability improves. FIG. 7D schematically shows an example of AF frames that are set in step S606 in the case where an upper left portion of the image is designated. In step S607, the camera control unit 125 sets (as a default setting) n horizontal AF frames and m vertical AF frames (in other words, a region of the same range as in the case of step S606) in th region of Y % of the entire image with respect to the screen center.

Figure 7E:
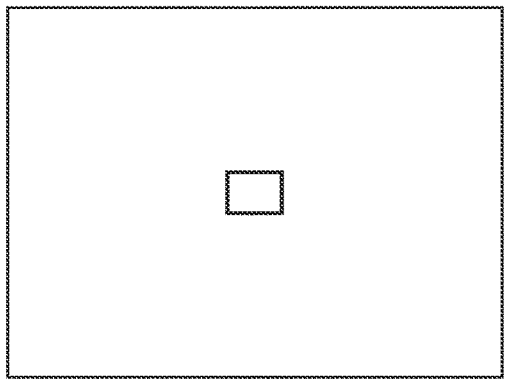

A series of operations of step S608 onward is setting of an AF frame composed of one region. This AF frame setting is set in the case where it is desired to execute focus detection on a static subject in a pinpoint region. FIG. 7E schematically shows the setting of this 1×1 AF frame. In step S608, the camera control unit 125 determines whether or not AF frame coordinates have been designated by the user. If it is determined that the coordinates of the AF frame have been set via the above-described touch panel or the operation SW 127, the camera control unit 125 advances the procedure to step S609. On the other hand, if it is determined that the above AF frame has not been designated, the camera control unit 125 advances the procedure to step S610. In step S609, the camera control unit 125 sets one AF frame of a predetermined size at the designated coordinates. On the other hand, in step S610, the camera control unit 125 sets one AF frame at the screen center (as a default setting). The camera control unit 125 then ends this series of operations.

Series of Operations Regarding Contrast AF Method

Figure 8:
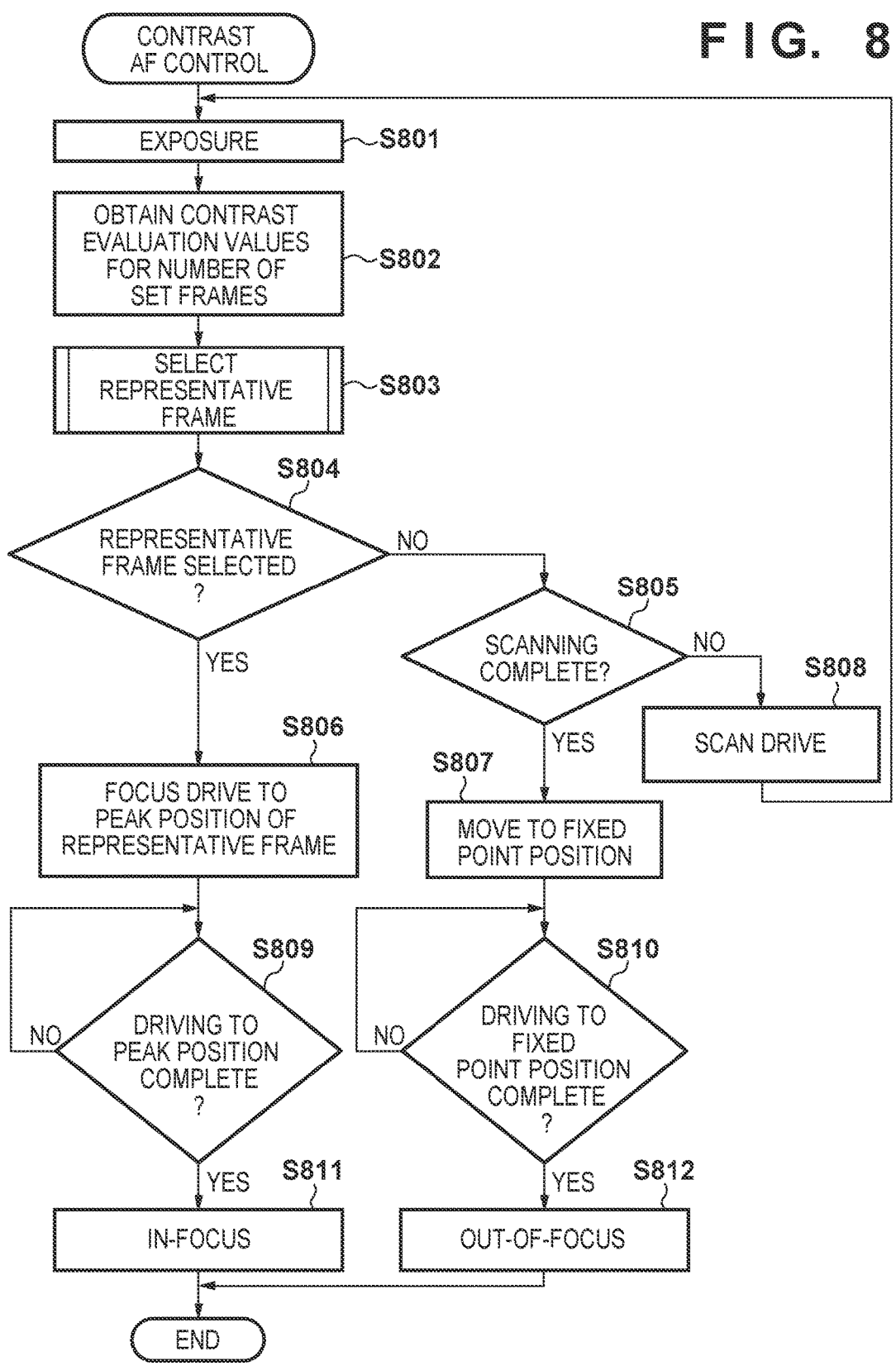
FIG. 8 is a flowchart showing a series of operations when "face priority" and "zone" are set in the case where a contrast AF method is adopted in focus detection control processing.

Next, a series of operations in the case where a contrast AF method is adopted in focus detection control when "face priority" or "zone" is set (different from the case in which one AF frame is set as was described with reference to FIG. 4) will be described with reference to FIG. 8.

In step S801, the camera control unit 125 uses the lens control unit 117 to expose the image sensor 122 at a plurality of focus lens positions in order to calculate contrast evaluation values. In step S802, the TVAF focus detection unit 130 obtains (calculates) contrast evaluation values for the number of set frames based on image information obtained by the exposure. In step S803, the camera control unit 125 selects a representative frame for performing focus control. The representative frame is an AF frame that is prioritized in focus detection control when a plurality of AF frames as illustrated FIGS. 7A, 7C and 7D are set, for example. Detailed description will be given with reference to FIG. 9.

In step S804, the camera control unit 125 determines whether or not a representative frame has been selected in step S803. For example, in step S907 to be described later, if there is a representative frame stored in the RAM 125b, the camera control unit 125 determines that a representative frame has been selected, and advances the procedure to step S806. On the other hand, if there is no representative frame, it is determined that a representative frame has not been selected, and the procedure advances to step S805.

In step S806, the camera control unit 125 uses the lens control unit 117 to move the focus lens to the peak position of the representative frame selected in step S803. In step S809, the camera control unit 125 stands by until the focus lens 104 is driven to the peak position (in other words, repeats the processing of step S809), and if it is determined that the focus lens 104 has been driven to the peak position, advances the procedure to step S811. After that, in step S811, the state transitions to an in-focus state. The camera control unit 125 then ends this series of processing.

On the other hand, in step S805, the TVAF focus detection unit 130 determines whether or not to end scanning. In the scanning end determination, it is determined whether or not the entire region from the far end to the near end has been scanned. If it is determined that the entire region has been scanned, it is determined that scanning is complete, and the procedure advances to step S807. On the other hand, if it is determined that the entire region has not been scanned, it is determined that scanning is not complete, and the procedure advances to step S808. In step S808, the camera control unit 125 moves focusing by a predetermined amount to continue scanning, and returns the procedure to step S801.

In step S807, the camera control unit 125 moves the focus lens 104 to an appropriate fixed point position since a peak could not be detected. The fixed point position may be the scanning start position or a hyperfocal positon. After that, in step S810, the camera control unit 125 determines, based on information from the lens control unit 117, whether or not movement of the focus lens 104 to the fixed point position is complete. If it is determined that movement to the fixed point position is complete, the procedure advances to step S812, and if it is determined that movement to the fixed point position is not complete, the procedure returns to step S810. Note that the lens does not need to be driven from the scanning end position in order to shorten the focus detection time.

After that, in step S812, the camera control unit 125 performs transition to an out-of-focus state, and ends this series of processing. If the focus state transitions to an in-focus state/out-of-focus state in steps S811 and S812 according to a user operation using the operation SW 127 or the like, display indicating the current focus state is output to the display unit 126 and the like. It is sufficient that, for example, the AF frame that has been set is displayed in green in the case of an in-focus state, and the AF frame is displayed in red in the case of an out-of-focus state, and the like. In a mode for setting a plurality of AF frames, an AF frame within the depth of focus is also brought into focus and displayed with respect to the peak position of the representative frame. Here, in step S205, if it is determined that servo AF control is enabled, focus display is updated every time focus detection control of step S301 shown in FIG. 3 is repeated.

Series of Operations Regarding Processing for Selecting Representative Frame

Figure 9:
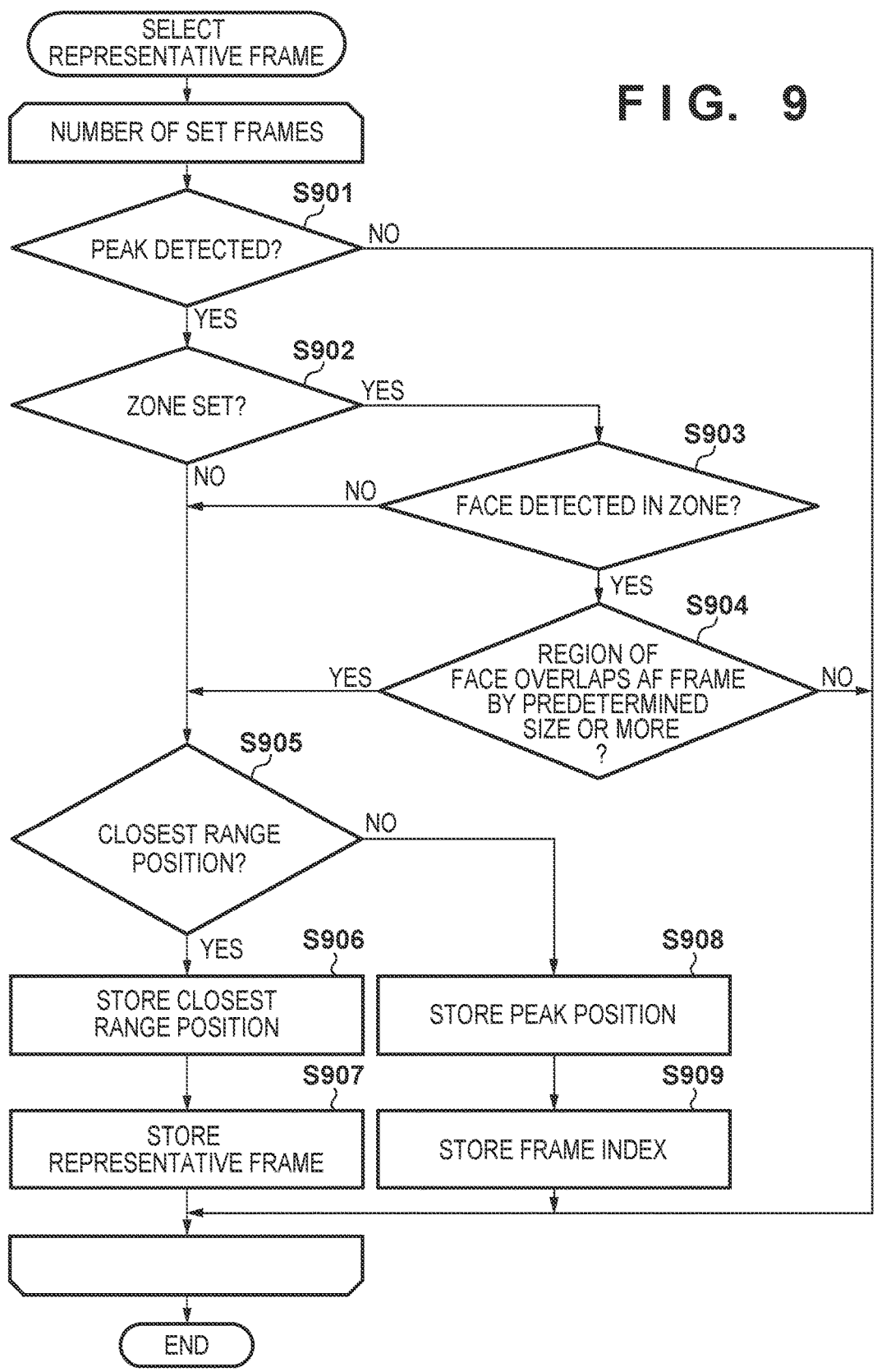
FIG. 9 is a flowchart showing a series of operations of representative frame selection processing.

Next, a series of processing regarding processing for selecting a representative frame in step S803 in FIG. 8 will be described with reference to FIG. 9. In this processing example, the camera control unit 125 repeats the processing of steps S901 to S909 for the number of frames that have been set in step S901, the TVAF focus detection unit 130 determines whether or not a peak has been detected in any of the AF frames that have been set. A peak is determined according to whether or not a local maximum value that is greater than or equal to a predetermined value has been detected among the contrast evaluation values obtained at the positions of the focus lens 104. If it is determined that a peak has been detected in any of the AF frames that have been set, the TVAF focus detection unit 130 advances the procedure to step S902, and if it is not determined that a peak has been detected, advances the procedure to step S903.

In step S902, the camera control unit 125 determines whether or not the zone described above with reference to FIG. 6 has been set. If it is determined that the zone has been set, similarly to step S601, the camera control unit 125 advances the procedure to step S903, and if it is determined that the zone has not been set, advances the procedure to step S905. In step S903, the camera control unit 125 determines whether or not a face has been detected in the zone by the face detection unit 131. In this determination, hysteresis is applied such that the detection result does not switch frequently in a short period, and, for example, if a face is detected in a region over a certain period of time or more, it is determined that the state is a detection state. This certain period of time may be changed according to movement of the subject or the like. If a face of a person has been detected in the zone by the face detection unit 131, the camera control unit 125 advances the procedure to step S904, and if a face of a person has not been detected in the zone, advances the procedure to step S905.

In step S904, the camera control unit 125 determines whether or not the region of the face overlaps the AF frame by a predetermined size or more. As this predetermined size, a size that does not result in erroneous distance measurement at the in-focus position and the in-focus position of the face is set. In step S905, the camera control unit 125 determines whether or not the peak position of the current AF frame is furthest on the close range side. If the peak of the current AF frame is further on the close range side than the peak of the AF frame stored in a previous set frame to be processed, this peak position is stored as the closest range position for focus drive in the RAM 125b in step S906. Furthermore, the closest-range AF frame stored in step S907 is stored as a representative frame in the RAM 125b, for example. Note that in this embodiment, the closest-range frame is adopted also if a face is detected, but the peak position obtained from an AF frame in the vicinity of the position of the eye may be stored as a peak position for focus driving depending on the scene and the size of the face region, and used as a representative frame.

Figures 12, 13A, 13B:
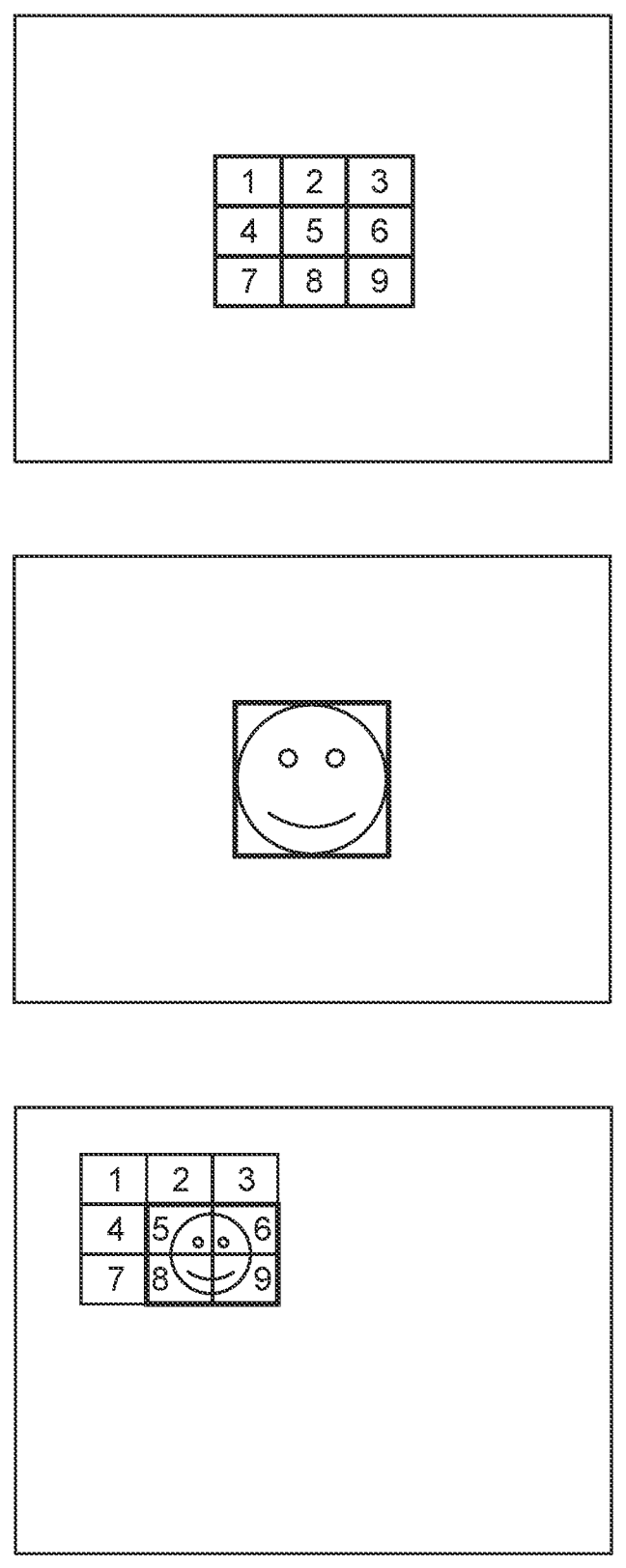

In step S905, if it is determined that the peak position of the current AF frame is not the closest-range peak position, the camera control unit 125 advances the procedure to step S908. In step S908, the camera control unit 125 then stores the peak position for determining whether or not the focus frame that is set in step S811 is within the depth of focus. Furthermore, in step S909, the camera control unit 125 causes an index for determining which frame position to display at the time of focus display in step S811 to be stored. The camera control unit 125 uses this index at the time of focus display to determine which AF frame to display. For example, FIG. 12 shows a display example when indices are assigned. In addition, FIG. 13A shows an example of focus display at the time of face detection when "face priority" is set, and FIG. 13B shows an example of focus display at the time of face detection when "zone" is set. In this embodiment, display appearance is differentiated when "face priority" is set and when "zone" is set. For example, in the case of "face priority", a focus frame is displayed explicitly over the entire face, and in the case of "zone", frames indicated by index numbers 5, 6, 8 and 9 in FIG. 12 are displayed as focus frames. With such a configuration, the user can easily understand, when using a digital camera, which frame setting is selected, in other words, whether focus detection is currently being performed with priority to face, zone or the like. When the camera control unit 125 finishes repeating the processing for the number of frames that have been set, this series of operations ends.

Series of Operations Regarding On-Imaging Plane Phase Difference AF Method

Figure 10:
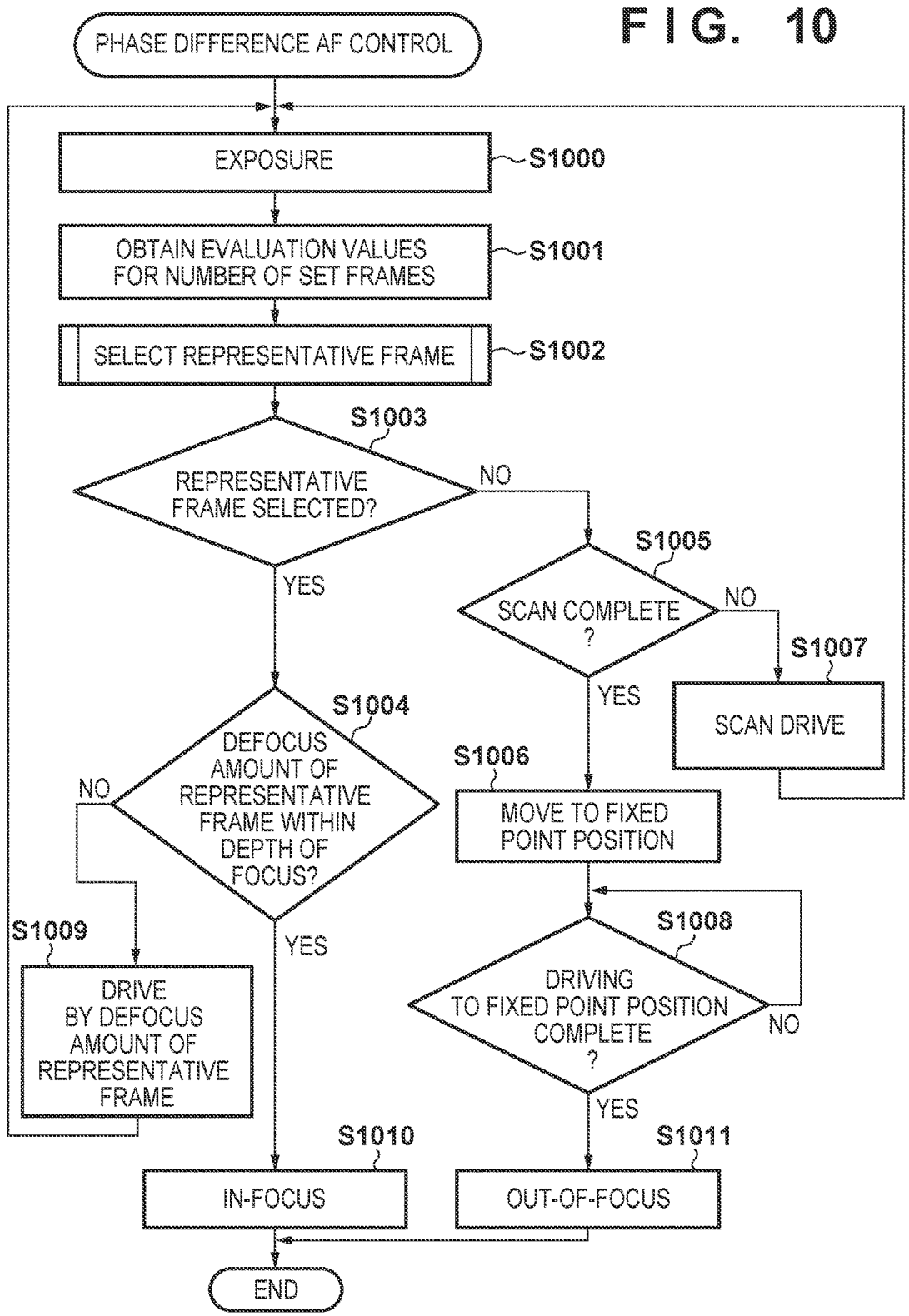
FIG. 10 is a flowchart showing a series of operations when "face priority" and "zone" are set in the case where an on-imaging plane phase difference AF method is adopted in focus detection control processing.

Furthermore, a series of operations in the case where as on-imaging plane phase difference AF method is executed in focus detection control when "face priority" or "zone" is set (this case is different from the case in which one AF frame is set as was described with reference to FIG. 5) will be described with reference to FIG. 10.

In step S1000, the camera control unit 125 exposes the image sensor 122 in order to obtain image information for calculating a defocus amount. In step S1001, the on-imaging plane phase difference focus detection unit 129 obtains defocus amounts for the number of AF frames that have been set, based on the image information, according to an instruction of the camera control unit 125. In step S1002, the camera control unit 125 selects a representative frame for performing focus control. Detailed description will be given with reference to FIG. 11.

In step S1003, the camera control unit 125 determines whether or not a representative frame has been selected. For example, if there is a representative frame that is stored in the RAM 125b in step S1107 to be described later, the camera control unit 125 determines that a representative frame has been selected, and advances the procedure to step S1004. On the other hand, if there is no representative frame, it is determined that a representative frame has not been selected, and the procedure advances to step S1005.

In step S1004, the on-imaging plane phase difference focus detection unit 129 determines whether or not the defocus amount to the in-focus position in the representative frame is within the range of depth of focus. If it is determined that the defocus amount is within the depth of focus, the procedure advances to step S1010, and if it is determined that the defocus amount is not within the depth of focus, the procedure advances to step S1009. In step S1010, the camera control unit 125 performs state transition to an in-focus state, and ends this series of processing.

On the other hand, in step S1009, the camera control unit 125 moves the focus lens 104 by a driving amount corresponding to the defocus amount obtained in step S1001 based on the defocus amount. After that, the procedure returns to step S1000.

On the other hand, in step S1005, the on-imaging plane phase difference focus detection unit 129 determines whether or not the entire region from the near end to the far end has been scanned, in order to move the position of the focus lens 104 so as to obtain a defocus amount of higher reliability. If it is determined that the entire region has not been scanned, the on-imaging plane phase difference focus detection unit 129 advances the procedure to step S1007, and on the other hand, if the entire region has been scanned, advances the procedure to step S1006. In step S1007, the camera control unit 125 moves the focus lens 104 by a predetermined amount, for example, returns the procedure to step S1000, and continues scanning.

In step S1006, the camera control unit 125 moves the position of the focus lens 104 to an appropriate fixed point, position since an in-focus position could not be detected. This fixed point position may be the scanning start position or a hyperfocal position. After that, in step S1008, the camera control unit 125 determines, based on information from the lens control unit 117, whether or not movement of the focus lens 104 to the fixed point position is complete. If it is determined that movement to the fixed point position is complete, the procedure advances to step S1011, and if it is determined that movement to the fixed point position is not complete, the procedure returns to step S1008. Note that the lens does not need to be driven from the scanning end position in order to shorten the focus detection time.

After that, in step S1011, the camera control unit 125 performs state transition to an out-of-focus state, and ends the processing. In steps S1010 and S1011, when the focus state transitions to an in-focus state/out-of-focus state according to a user operation using the operation SW 127 or the like, the camera control unit 125 outputs, to the display unit 126 and the like, display indicating the current focus state. For example, it is sufficient that an AF frame that has been set is displayed in green in the case of an in-focus state, an AF frame is displayed in red in the case of an out-of-focus state, and the like. Here, if it is determined in step S205 that servo AF control is enabled, as shown in FIG. 3, focus display is updated every time focus detection control in step S301 is repeated.

Series of Operations Regarding Processing for Selecting Representative Frame

Figure 11:
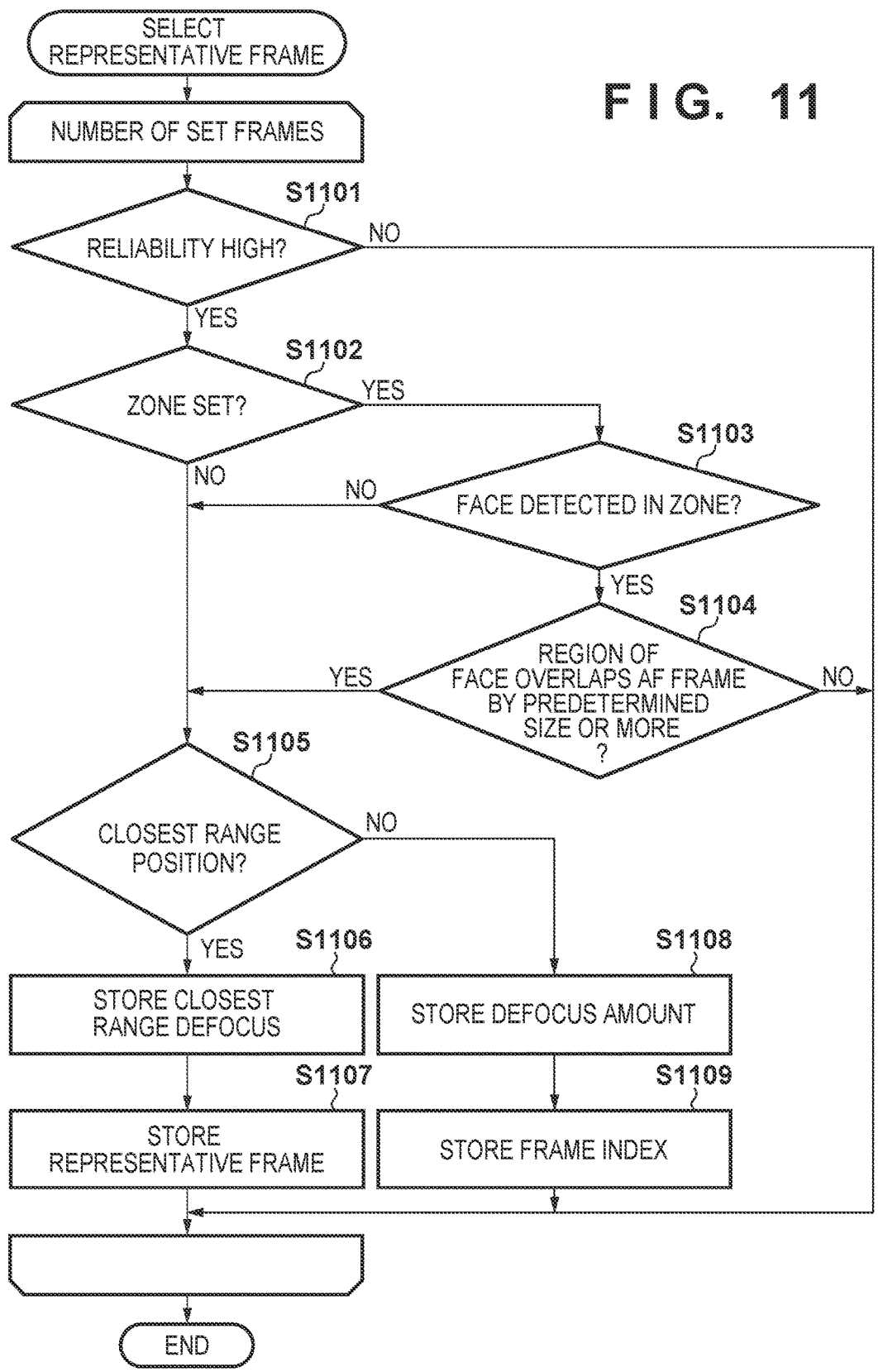
FIG. 11 is a flowchart showing a series of operations of representative frame selection processing.

Furthermore, a series of operations regarding processing for selecting a representative frame in step S1002 shown in FIG. 10 will be described with reference to FIG. 11. In this processing example, the processing of steps S1101 to S1109 is repeated for the number of frames that have been set by the camera control unit 125.

In step S1101, the on-imaging plane phase difference focus detection unit 129 determines whether or not an AF frame of high reliability has been detected among AF frames that have been set. If it is determined that an AF frame of high reliability has been detected, the on-imaging plane phase difference focus detection unit 129 advances the procedure to step S1102, and on the other hand, if it is determined that all the AF detection frames are not highly reliable, advances the procedure to step S1103.

In step S1102, it is determined whether or not the zone described above with reference to FIG. 6 has been set. Similarly to step S601, if it is determined that the zone has been set, the camera control unit 125 advances the procedure to step S1103, and if it is determined that the zone has not been set, advances the procedure to step S1105.

In step S1103, the camera control unit 125 determines whether or not a face has been detected in the zone by the face detection unit 131. In this determination, hysteresis is applied such that the detection result does not switch frequently in a short period, and, for example, if a face is detected in a region over a certain period of time or more, it is determined that the state is a detection state. This certain period of time may be changed according to the movement of the subject or the like. In step S1104, the camera control unit 125 determines whether or not the region of the face overlaps the AF frame by a predetermined size or more. As this predetermined size, a size that does not result in erroneous distance measurement at the in-focus position of the background and the in-focus position of the face is set.

In step S1105, the camera control unit 125 determines whether or not the defocus position (in-focus position) of the current AF frame is furthest on the close range side. If the current defocus position is further on the close range side than the defocus position on the close range side stored in a previous set frame to be processed, this defocus position is stored as the closest range position for focus drive in the RAM 125b in step S1106. Furthermore, in step S1107, the camera control unit 125 causes the RAM 125b to store the stored closest range AF frame as a representative frame, for example. Note that in this embodiment, the closest range frame is also adopted in the case where a face has been detected, but depending on a scene and a face region size, a defocus position obtained from an AF frame in the vicinity of the position of the eye may be stored as a defocus position for focus drive, and used as a representative frame.

In step S1105, if it is determined that the peak position of the current AF frame is not the closest range defocus position, the camera control unit 125 advances the procedure to step S1108. After that, in step S1108, the camera control unit 125 stores a defocus position for determining whether or not the representative frame is within the depth of focus at the time of focus display in step S1010. Furthermore, in step S1109, the camera control unit 125 causes an index for determining which frame position to display at the time of focus display in step S1010 to be stored. When the camera control unit 125 finishes repeating the processing for the number of frames that have been set, this series of operations ends.

As described above, in this embodiment, a configuration is adopted in which during AF frame (in other words, focus detection region) setting, if "face priority" is set, focus detection is not performed on the region of a subject detected outside of the focus detection region, and a focus detection region is determined within a region of a predetermined size. Specifically, a face region has been detected, the face region is determined as the focus detection region, and if a face region has not been detected, the region of the predetermined size is determined as the focus detection region. With such a configuration, erroneous focus detection of a subject that appears on the periphery of the image other than the main subject can be reduced. In addition, if "zone" is set, at a position regarding zone designation, a region of a range that is smaller than the above region of the predetermined size in the case of the face priority setting is set as the focus detection region. With such a configuration, it becomes possible to strengthen restriction on the position/range over restriction that is based on face designation, and to reduce erroneous focus detection of a peripheral or movthg subject. In other words, it becomes possible to perform a focus detecting operation in which incorrect focus detection with respect to a peripheral subject other than a main subject or a moving subject is reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Biu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-122875, filed Jun. 21, 2016, which is hereby incorporated by reference herein in its entirety.

What is claimed is:

1. A focus detection apparatus which performs focus detection using image information obtained by performing image capturing, comprising:
   a memory storing a set of instructions; and
   at least one processor that executes the set of instructions to function as:
   a reception unit configured to receive designation of a region within an image;
   a first setting unit configured to set one focus detection mode out of a plurality of focus detection modes, wherein the focus detection modes include at least a first mode for performing focus detection with priority to a region of a subject within the image and a second mode for performing focus detection with priority to the designated region within the image received by the reception unit;
   a second setting unit configured to set a focus detection region for performing the focus detection;
   a selection unit configured to select a region to focus on out of the focus detection region based on a focus detection result of the focus detection region; and
   a control unit configured to perform focus adjustment so as to obtain image information in which the region to focus on is in focus,
   wherein the second setting unit, in the first mode, in a case where a subject is detected, sets the focus detection region based on the region of the subject, and in a case where a subject is not detected, sets the focus detection region to a predetermined region, and
   in the second mode, sets the focus detection region based on the designated region,
   wherein the second setting unit, in the second mode, in a case where a region is designated in the image by the reception unit, set, in a partial region of the image, the focus detection region based on designated coordinates as a center, and in a case where a region within the image is not designated by the reception unit, set, in a partial region of the image, the focus detection region based on a center of the image,
   wherein, in the second mode, a focus state is displayed for each focus detection region regardless of whether or not a subject is detected.

2. The apparatus according to claim 1, wherein the focus detection modes include a third mode for performing focus detection in one region within the image.

3. The apparatus according to claim 1, wherein the second setting unit, in the second mode, sets the focus detection region regardless of whether or not a subject is detected.

4. The apparatus according to claim 1, wherein the selection unit selects one of a plurality of regions included in the focus detection region as the region to focus on, based on a focus detection result for each of the plurality of regions.

5. The apparatus according to claim 1, wherein the at least one processor further functions as comprising:
   a display control unit configured to perform control for displaying a focus state in the focus detection region;
   wherein the display control unit performs control such that a display appearance of a focus state differs in a case where the focus state is evaluated in the first mode and in a case where the focus state is evaluated in the second mode.

6. The apparatus according to claim 4, wherein the at least one processor further functions as comprising:
   a display control unit configured to perform control for displaying a focus state in the focus detection region,
   wherein the display control unit performs control so as to display a focused region as one frame in the first mode, and to display the focused region as a plurality of frames in the second mode.

7. The apparatus according to claim 1, wherein
   in a case where the region of the detected subject is greater than or equal to a predetermined size, and has existed in the focus detection region for a predetermined time period, the selection unit includes the region of the subject in the region to focus on.

8. The apparatus according to claim 1, wherein
   the selection unit obtains a focus state in the focus detection region, based on a contrast of image information obtained by performing image capturing at a plurality of focus lens positions.

9. The apparatus according to claim 1, wherein
   the selection unit obtains a focus state in the focus detection region based on a shift amount of a pair of image signals formed from a light beam that has passed through different pupil regions of an imaging optical system, the shift amount being included in the image information obtained by performing image capturing.

10. The apparatus according to claim 1, wherein the at least one processor further functions as comprising:
    a detection unit configured to detect the region of the subject within the image,
    wherein the detection unit detects a region of a face of a person as the region of the subject.

11. A control method of a focus detection apparatus which performs focus detection using image information obtained by performing image capturing, the method comprising:
    receiving designation of a region within an image;
    setting, as first setting, one focus detection mode out of a plurality of focus detection modes, wherein the focus detection modes include at least a first mode for performing focus detection with priority to a region of a subject within the image and a second mode for performing focus detection with priority to the designated region within the image;
    setting, as second setting, a focus detection region for performing the focus detection;
    selecting a region to focus on out of the focus detection region based on a focus detection result of the focus detection region; and
    controlling focus adjustment so as to obtain image information in which the region to focus on is in focus;
    wherein in the second setting, in the first mode, in a case where a subject is detected, the focus detection region is set based on the region of the subject, and in a case where a subject is not detected, the focus detection region is set to a predetermined region, and
    in the second mode, the focus detection region is set based on the designated region,
    wherein in the second setting, in the second mode, in a case where a region is designated in the image in the receiving a designation, setting, in a partial region of the image, the focus detection region based on designated coordinates as a center, and in a case where a region within the image is not designated in the receiving a designation, setting, in a partial region of the image, the focus detection region based on a center of the image, wherein, in the second mode, a focus state is displayed for each focus detection region regardless of whether or not a subject is detected.

12. A non-transitory computer-readable storage medium storing a program for causing a computer to execute a control method of a focus detection apparatus which performs focus detection using image information obtained by performing image capturing, the method comprising:

receiving designation of a region within an image;

setting one focus detection mode out of a plurality of focus detection modes, wherein the focus detection modes include at least a first mode for performing focus detection with priority to a region of a subject within an image and a second mode for performing focus detection with priority to the designated region within the image;

setting a focus detection region for performing the focus detection;

selecting a region to focus on out of the focus detection region based on a focus detection result of the focus detection region; and performing focus adjustment so as to obtain image information in which the region to focus on is in focus, wherein in the first mode, in a case where a subject is detected, the focus detection region is set based on the region of the subject, and in a case where a subject is not detected, the focus detection region is set to a predetermined region, and in the second mode, the focus detection region is set based on the designated region, wherein in the second setting, in the second mode, in a case where a region is designated in the image in the receiving a designation, setting, in a partial region of the image, the focus detection region based on designated coordinates as a center, and in a case where a region within the image is not designated in the receiving a designation, setting, in a partial region of the image, the focus detection region based on a center of the image, wherein, in the second mode, a focus state is displayed for each focus detection region regardless of whether or not a subject is detected.

* * * * *